(12) United States Patent
Proctor

(10) Patent No.: US 9,079,327 B2
(45) Date of Patent: Jul. 14, 2015

(54) WOODWORKING HAND TOOL

(71) Applicant: Robert Sorby Limited, Sheffield, South Yorkshire (GB)

(72) Inventor: Philip Proctor, Sheffield (GB)

(73) Assignee: ROBERT SORBY LIMITED (GB)

( * ) Notice: Subject to any disclaimer, the term of this patent is extended or adjusted under 35 U.S.C. 154(b) by 159 days.

(21) Appl. No.: 13/850,891

(22) Filed: Mar. 26, 2013

(65) Prior Publication Data
US 2014/0007979 A1  Jan. 9, 2014

(30) Foreign Application Priority Data

Jul. 5, 2012 (GB) .................................. 1211955.8

(51) Int. Cl.
*B27C 7/02* (2006.01)
*B23B 27/02* (2006.01)
*B23B 27/08* (2006.01)
*B27G 15/00* (2006.01)

(52) U.S. Cl.
CPC .............. *B27G 15/00* (2013.01); *B23B 27/02* (2013.01); *B23B 27/08* (2013.01)

(58) Field of Classification Search
CPC ............. B23C 7/06; B23C 7/02; B23G 15/00
USPC .......................................................... 142/56
See application file for complete search history.

(56) References Cited

U.S. PATENT DOCUMENTS

| | | | | | |
|---|---|---|---|---|---|
| 652,015 | A | * | 6/1900 | Cunningham | 407/83 |
| 932,576 | A | * | 8/1909 | Ramsey | 407/10 |
| 1,237,021 | A | * | 8/1917 | Corke | 407/9 |
| 1,368,119 | A | * | 2/1921 | Cockcroft | 29/35.5 |
| 2,914,098 | A | * | 11/1959 | McLennan, Sr. | 142/56 |
| 3,277,933 | A | * | 10/1966 | Lalli | 142/47 |
| 4,126,165 | A | * | 11/1978 | Guignard et al. | 142/56 |
| 4,497,352 | A | * | 2/1985 | Lippolt | 142/48 |
| 5,137,065 | A | * | 8/1992 | Stewart | 142/56 |
| 7,032,633 | B2 | * | 4/2006 | Clay | 144/33 |
| 2007/0151428 | A1 | * | 7/2007 | Hunter | 82/1.11 |

* cited by examiner

*Primary Examiner* — Will Fridie, Jr.
(74) *Attorney, Agent, or Firm* — Clark Hill PLC

(57) ABSTRACT

A woodworking hand tool, particularly for use in woodturning, comprises
  a shaft like handle provided at one end with a metallic cutting edge, and also with a flat along at least part of its length for engagement, in use, with a tool rest of a lathe or other machine, for stability and
  wherein the cutting edge is carried on, or by an adaptor that is rotationally adjustable with respect to the handle between at least two operational positions by the user, depending on the cutting action required.

12 Claims, 3 Drawing Sheets

WOODWORKING HAND TOOL

FIELD OF THE INVENTION

The present invention relates to a hand tool for use in woodworking, and predominantly in woodturning.

BACKGROUND OF THE INVENTION

Such hand tools basically consist of a shaft like handle provided at one end with a metallic cutting edge.

Conventionally, the handle and cutting edge or tip are in a fixed relationship e.g. in the same plane, whether flat and level with each other, or at an angle to each other.

In some circumstances there is a requirement to offer the cutting edge or tip to the wood being machined at an angle other than the predetermined, fixed angle. This has led to the need for the user to acquire multiple hand tools to achieve both scraping and shear scraping actions.

OBJECT OF THE INVENTION

A basic object of the present invention is the provision of an improved woodworking hand tool.

SUMMARY OF THE INVENTION

According to one aspect of the present invention, there is provided a woodworking hand tool, particularly for use in woodturning, comprising a shaft like handle; a metallic cutting edge at the end of said shaft like handle; and an adaptor; the shaft like handle having a flat along at least part of its length for engagement, in use, with a tool rest of a lathe or other machine, for stability; and wherein the metallic cutting edge is received by the adapter positioned between the metallic cutting edge and the shaft like handle; the adaptor having an enlarged diameter, circumferential collar at the opposite end to the metallic cutting edge; and the adaptor is rotationally adjustable with respect to the handle between at least two operational positions, depending on the cutting action required.

The invention includes woodworking tool comprising:
a shaft having a flat portion along at least part of its length;
an adapter held in the end of the shaft by a clamping means;
a collar for engaging said clamping means on said adapter;
said clamping means configured for screwing onto a threaded tubular end of said shaft;
a cutting tip;
a distal end of said adapter having a machined bed for holding said cutting tip;
said shaft having at least one recess adapted to engage said adapter at a selected one of a plurality of rotational orientations of said adapter with respect to said shaft, so that said cutting tip can be held at one of a plurality of angular positions relative to said flat surface of said shaft.

Other aspects are as set out in the claims herein.

The invention may provide a woodworking tool, and specifically a woodturning tool with the ability for the user to vary the angle of the cutting edge in relationship to the handle, whereby both scraping and shear scraping can be effected by one and the same tool.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

Figure 1:
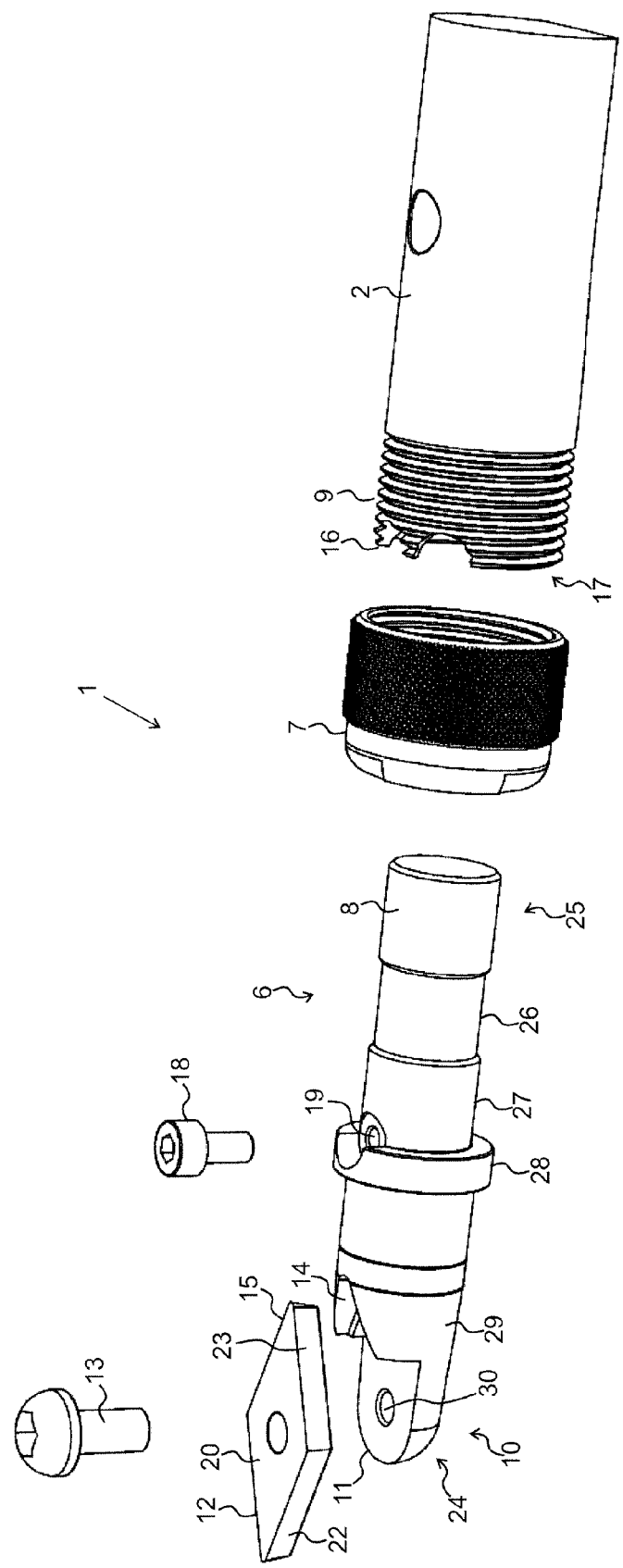
FIG. 1 is an exploded perspective view of a woodworking hand tool according to the invention.
Figure 2:
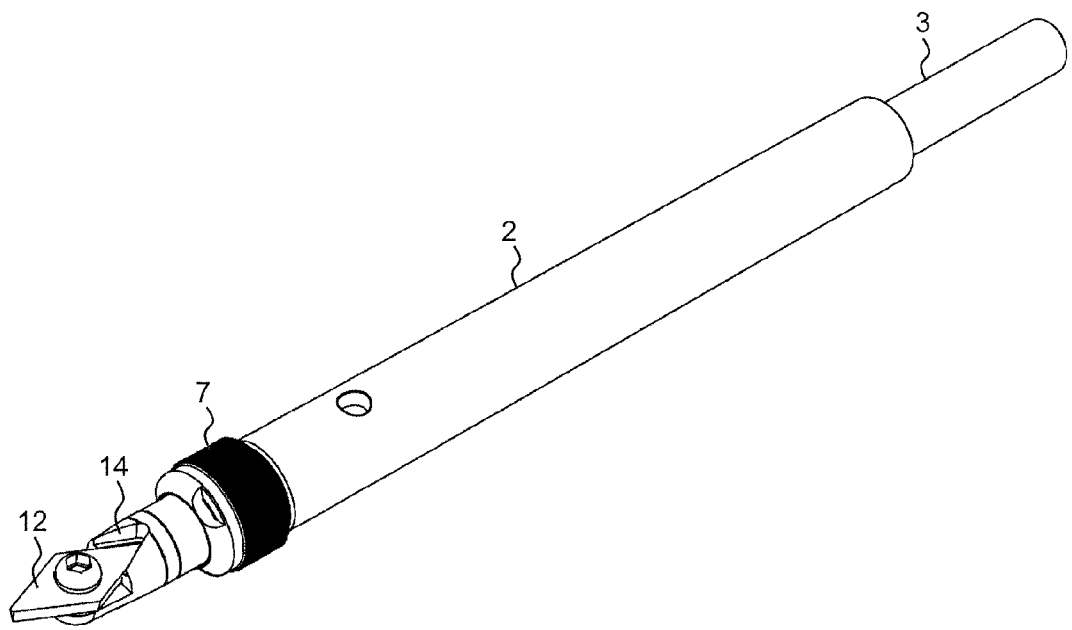
FIG. 2 corresponds to FIG. 1 but shows the hand tool assembled.
Figure 3:
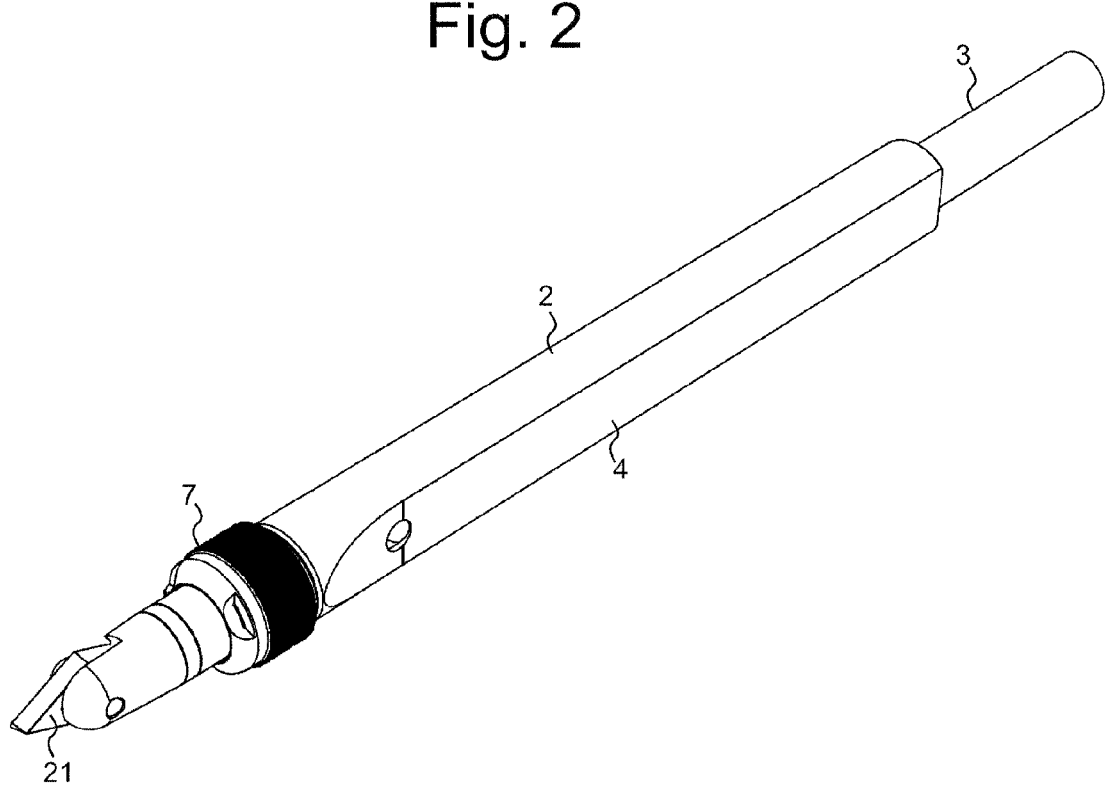
FIG. 3 corresponds to FIG. 2, but is a perspective view from below.
Figure 4:
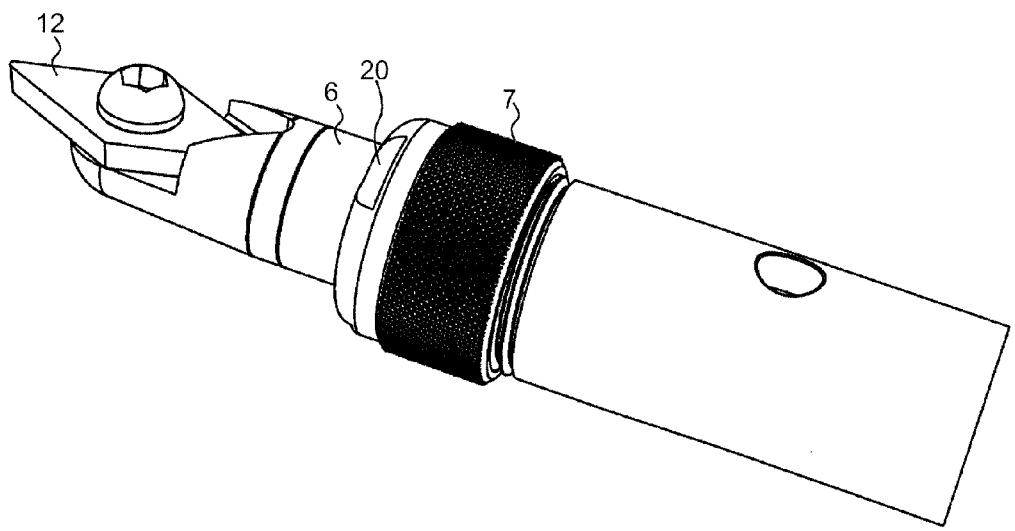
FIG. 4 shows in greater detail, one end of the woodworking hand tool.
Figure 5:
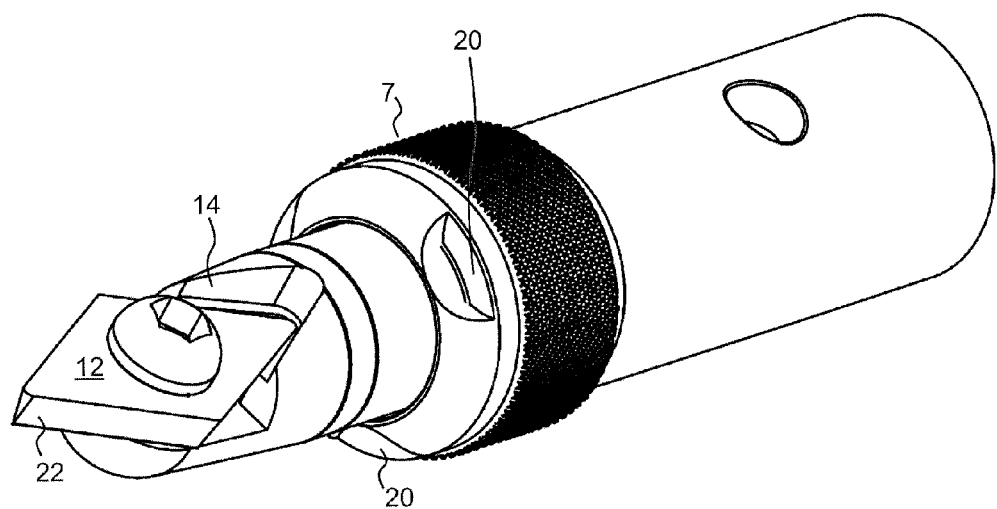
FIG. 5 shows in another perspective view, the end of the woodworking hand tool.

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

As is shown in the drawings, a woodturning hand tool 1 has a shaft-like handle 2 terminating in a spigot 3 to engage the bore of a hand grip (not shown).

The shaft-like handle 2 has a flat 4 along part of its length for engagement with a hand rest on a woodworking machine such as a lathe, to ensure that the tool can be held stable during a woodworking operation.

At the end of the shaft-like handle, an adaptor 6 is provided, held in the end of the shaft-like handle 2 by a screwed clamping ring 7 engaging a collar 8 on the adaptor, the ring 7 screwing on to the threaded tubular end 9 of the shaft-like handle 2.

The outer end 10 of the adaptor has a machined bed 11 for a cutting tip 12 held to the bed by a fixing screw 13 engaging a threaded hole in the bed. As shown, the cutting tip 12 is of rhomboidal shape with multiple cutting edges, and to ensure that it does not rotate about the screw 13 during use, a V-shaped slot 14 is machined in the end of the adaptor, to receive a V-shaped end 15 of the tip.

To provide for the correct alignment of the adaptor and hence the cutting tip, with respect to the shaft-like handle 2, a recess 16 is provided in the peripheral edge 17 of the shaft-like handle for engagement by a screw 18 engaging a threaded hole 19 in the adaptor.

Thus, with the clamping ring 7 slid on to the adaptor from the front, and with the adaptor 6 inserted into the shaft-like handle, the threaded hole 19 in the adaptor is aligned with a recess 16 in the edge of the shaft-like handle 2 and the screw 18 secured into the threaded hole 19, the clamping ring 7 can be tightened on to the screw threaded end 9 of the shaft-like handle. Flats 20 on the clamping ring 7 may be engaged by an appropriate spanner to assist in tightening or loosening the clamping ring.

There may be at least two and preferably three recesses 16, each strategically positioned arcuately about the axis of the shaft-like handle 2, and hence the flat 4, such that with a particular recess 16 engaging the screw 18, and with the flat 4 positioned on the tool rest of a woodworking machine, the cutting tip 12 is accurately and correctly, presented to the workpiece on the machine, and can with relative ease by adjusted to a second required position as may be required by the woodcutting operation being performed on the workpiece.

The rotational position of the adaptor 6 can be adjusted relative to the angular position of the handle 2 and flat 4, by unscrewing the clamping ring 7, pulling the adaptor in an axial direction away from the handle, rotating the adaptor so that the screw and threaded hole 18, 19 are aligned with a different recess 16, and tightening the ring 7 to seat the screw 18 in a different recess 16 of the plurality of recesses.

The cutting tip comprises a single piece component having an upper face 20 forming a first parallelogram, and a lower face 21 forming a second parallelogram, the first and second parallelograms being spaced apart from each other. The respective main planes of the upper face and the lower face are substantially parallel to each other, and the lower face is slightly smaller in dimension than the upper face, so that first and second side faces 22,23 extend between the upper and lower faces on one side of the cutting tip, whilst a third and fourth side face extend between the upper and lower faces on an opposite side of the tip. The side faces are each have a main plane which is angled with respect to a direction perpendicular to the main planes of the upper and lower faces 20, 21 so that the tip has the divergent appearance of a ship's bow at the rear tip 15, and at the opposite front tip.

The intersections between the side faces and the upper and lower faces provide cutting edges of the tip.

The adaptor 6 comprises a single metal piece having a first end 24 and a second end 25; between the first and second ends, a collar region 8 at the second end; a neck region 26, between the collar 8 and the first end, the neck region being cylindrical and having a smaller outside diameter than the collar 8; forward of the neck region 26, a second collar region 27 having an outside diameter substantially the same as the first collar 8, the threaded hole 19 being positioned at a forward end of the second collar region; forward of the second collar region 27, a substantially cylindrical ring region 28 extending forward of the second collar region 27 and having part cylindrical recess for fitting the head of the cap head bolt of screw 18, the cylindrical recess having a main central axis perpendicular to a main central axis of the adaptor 6; a forward region 29 which is substantially cylindrical, and having a domed forward end, part of which is cut away to form the machined bed 11 and "V" shaped alcove or slot 14. At the forward region 29, there is provided a tapped threaded hole 30 for accepting the cap head screw or bolt 13 to retain the cutting tool 12 to the bed 11.

The handle or shaft 2 has a through hole 31 for insertion of a tool to allow for gripping the shaft to allow rotation of the shaft relative to the ring 7, when unscrewing or tightening the ring 7, and/or for removal of the spigot form a machine.

When assembled, a front flange of the ring 7 retains the central ring 28 of the adaptor in position adjacent the peripheral edge 17 of the shaft, engaging the screw 18 with a selected one of the recesses 16 to maintain the cutting tip 12 in a predetermined fixed angular relationship relative to the flat surface 4 of the shaft. For assembly, the ring 7 fits over the end of the adaptor 6 and slides along the adaptor up to the point where the front annular flange of the ring 7 meets the central ring 28 of the adaptor. Tightening the ring 7 urges the adaptor towards the shaft 2 and secures the adaptor to the shaft.

Preferred Or Optional Features Of The Invention

The adaptor is generally of circular section.

The adaptor is elongate, with a longitudinal axis, with one end providing or carrying a cutting edge, and with the other end constituting a mounting spigot.

The handle is of generally circular section.

The handle is provided at one end (a cutting end) with a socket of dimensions to receive the end of the adaptor.

The cutting end of the shaft is provided with at least two angularly spaced apart formations.

The formations are concave recesses.

The adaptor is provided with an abutment member engageable in a user-selected formation, and hence serving to positively set the angle of the adaptor with respect to the handle.

The cutting end is provided with three angularly spaced apart formations.

The adaptor, distal from its mounting spigot, is provided with a cutting edge.

The metallic cutting edge is provided by a re-sharpenable edge.

The metallic cutting edge is provided by a replaceable tip.

The adaptor, distal from its mounting spigot, is provided with a bed to receive a replaceable multi-edge cutting tip.

The tip is of tool steel/high speed steel

The tip is of titanium nitrate coated tool steel/high speed steel.

The tip is of carbide.

The carbide is tungsten carbide.

The tip is secured to the bed by a set screw.

The set screw has a socket for engagement by a Torx (trademark) or similar key.

The adaptor is provided, intermediate its end, with an enlarged diameter, circumferential collar serving to engage the cutting end of the handle and thereby to limit the penetration of the mounting spigot into the socket of the handle, as well as enabling adaptor-to-handle clamping, as will be described below.

The cutting end of the handle is externally threaded.

A threaded clamping ring, having at one end an unturned flange to engage one side of the circumferential collar, is internally threaded, so that, after passage over the adaptor until flange-to-collar engagement is achieved, and with the mounting spigot inside the socket of the handle, the threaded ring may be screwed onto the threads of the handle to clamp and secure the adaptor to the handle.

Flats or finger recesses are provided on the clamping ring so that screwing and unscrewing can be effected by a spanner.

Three concave flats at 120° spacing are provided, engageable by a specially shaped ring spanner.

A rear of the socket of the handle is intersected by a diametrical hole through the handle, so that any mounting spigot that is difficult to release, may be freed by inserting a tool into the diametrical hole and engaging the end of the mounting spigot, which tool may also be used as a tommy bar for tightening the clamping ring connection between the adaptor and the handle.

The abutment member of the adaptor may be of fixed position if the angular adjustment options, represented by two or three concave recesses provide at ideal positions for normal working are the only angular positions required. Thus, a central recess or notch would be engaged by the abutment member for presenting the cutting edge in a flat i.e. horizontal attitude to the work piece, for what is known as scraping, whilst to achieve what is known as shear scraping, the user would have to alter the angle, typically by 45° to the left or right of the central notch in a 3 notch configuration, by releasing the clamping ring sufficiently to permit disengagement of the abutment member from the previously selected recess or notch, rotating of the adaptor through e.g. 45° engagement with the newly selected recess or notch, and re-tightening of the clamping ring.

If a facility for infinite angular adjustment is required between the adaptor and the handle, then the abutment member is of a removable form—such as a cap head screw engageable in radial tapped hole in the adaptor, so that the user is not confined to three ideal settings represented by three recesses or notches, but can select any angular setting of his choosing.

The invention claimed is:

1. A woodworking hand tool, particularly for use in woodturning, comprising a shaft like handle;
   a metallic cutting edge at the end of said shaft like handle; and
   an adaptor;
   the shaft like handle having a flat along at least part of its length for engagement, in use, with a tool rest of a lathe or other machine, for stability; and
   wherein the metallic cutting edge is received by the adaptor positioned between the metallic cutting edge and the shaft like handle;
   the adaptor having an enlarged diameter, circumferential collar at the opposite end to the metallic cutting edge; and
   the adaptor is rotationally adjustable with respect to the handle between at least two operational positions, depending on the cutting action required.

2. A woodworking tool as in claim 1, wherein the adaptor is elongate, with a longitudinal axis, with one end providing or carrying a cutting edge, and with the other end constituting a mounting spigot.

3. A woodworking tool as in claim 1, wherein the handle is provided at one end (a cutting end) with a socket of dimensions to receive the end of the adaptor.

4. A woodworking tool as claimed in claim 1, wherein the cutting end of the shaft is provided with at least two angularly spaced apart formations.

5. A woodworking tool as claimed in claim 1, wherein the adaptor is provided with an abutment member engageable in a user-selected formation, and hence serving to positively set the angle of the adaptor with respect to the handle.

6. A woodworking tool as claimed in claim 1, wherein the adaptor is provided with a cutting edge.

7. A woodworking tool as claimed in claim 1, wherein the adaptor is provided with a cutting edge, and the cutting edge is formed by a multi-edged replaceable cutting tip, removably secured on a support bed on the adaptor.

8. A woodworking tool as claimed in claim 1, wherein the enlarged diameter circumferential collar of the adaptor serves to engage the cutting end of the handle and thereby to limit the penetration of the mounting spigot into the socket of the handle, as well as enabling adaptor-to-handle clamping.

9. A woodworking tool as claimed in claim 1, wherein the enlarged diameter circumferential collar of the adaptor serves to engage the cutting end of the handle and thereby to limit the penetration of the mounting spigot into the socket of the handle, as well as enabling adaptor-to-handle clamping; and a threaded clamping ring, having at one end an unturned flange to engage one side of the circumferential collar, is internally threaded, so that, after passage over the adaptor until flange-to-collar engagement is achieved, and with the mounting spigot inside the socket of the handle, the threaded ring may be screwed onto the threads of the handle to clamp and secure the adaptor to the handle.

10. A woodworking tool as claimed in claim 1, wherein the enlarged diameter circumferential collar of the adaptor serves to engage the cutting end of the handle and thereby to limit the penetration of the mounting spigot into the socket of the handle, as well as enabling adaptor-to-handle clamping; and a threaded clamping ring, having at one end an unturned flange to engage one side of the circumferential collar, is internally threaded, so that, after passage over the adaptor until flange-to-collar engagement is achieved, and with the mounting spigot inside the socket of the handle, the threaded ring may be screwed onto the threads of the handle to clamp and secure the adaptor to the handle; and flats or finger recesses are provided on the clamping ring so that screwing and unscrewing can be effected by a spanner.

11. A woodworking tool as claimed in claim 1, wherein a rear of the socket of the handle is intersected by a diametrical hole through the handle, so that any mounting spigot that is difficult to release, may be freed by inserting a tool into the diametrical hole and engaging the end of the mounting spigot, which tool may also be used as a tommy bar for tightening the clamping ring connection between the adaptor and the handle.

12. Woodworking tool comprising:
   a shaft having a flat portion along at least part of its length;
   an adapter held in the end of the shaft by a clamping means;
   a collar for engaging said clamping means on said adapter;
   said clamping means configured for screwing onto a threaded tubular end of said shaft;
   a cutting tip;
   a distal end of said adapter having a machined bed for holding said cutting tip;
   said shaft having at least one recess adapted to engage said adapter at a selected one of a plurality of rotational orientations of said adapter with respect to said shaft, so that said cutting tip can be held at one of a plurality of angular positions relative to said flat surface of said shaft.

* * * * *